United States Patent [19]
Kahn et al.

[11] Patent Number: 5,678,787
[45] Date of Patent: *Oct. 21, 1997

[54] DOOR ASSEMBLY WITH SHEAR LAYER CONTROL APERTURE

[75] Inventors: William C. Kahn, Denton; John T. Johnston; Kyle G. Fluegel, both of Greenville, all of Tex.

[73] Assignee: E-Systems, Inc., Dallas, Tex.

[*] Notice: The term of this patent shall not extend beyond the expiration date of Pat. No. 5,520,358.

[21] Appl. No.: 603,892

[22] Filed: Feb. 22, 1996

Related U.S. Application Data

[63] Continuation of Ser. No. 292,010, Aug. 18, 1994, Pat. No. 5,520,358.

[51] Int. Cl.⁶ .................................................. B64C 1/14
[52] U.S. Cl. ..................... 244/129.5; 244/1 R; 49/40; 359/894
[58] Field of Search ........................ 244/1 R, 129.1, 244/129.3, 129.4, 129.5; 49/40, 116, 118, 370; 343/705; 359/894, 896; 354/74, 65

[56] References Cited

U.S. PATENT DOCUMENTS

| | | |
|---|---|---|
| 2,214,722 | 9/1940 | Seversky . |
| 2,630,983 | 3/1953 | Horne et al. . |
| 3,585,757 | 6/1971 | Ritchie . |
| 4,375,876 | 3/1983 | Stewart . |
| 4,703,904 | 11/1987 | Haslund . |
| 4,858,850 | 8/1989 | McNay . |
| 4,887,779 | 12/1989 | Large . |
| 5,064,147 | 11/1991 | Noble et al. . |
| 5,069,397 | 12/1991 | Haslund . |

*Primary Examiner*—Galen L. Barefoot
*Attorney, Agent, or Firm*—Harold E. Meier

[57] ABSTRACT

There is described a vehicle door assembly with shear layer control for controlling the airflow in and around an aperture in the vehicle fuselage. The vehicle door assembly consists of an upper door and a lower door, both slidably mounted to the exterior surface of the vehicle fuselage. In addition, an inner door is slidably mounted beneath the upper door. Beneath the inner door is an aperture assembly having an aperture opening positionable to be substantially flush with the exterior surface of the vehicle fuselage. Also provided are means for positioning the aperture assembly in an upward and downward direction in relation to the vehicle fuselage.

18 Claims, 9 Drawing Sheets

DOOR ASSEMBLY WITH SHEAR LAYER CONTROL APERTURE

This application is a continuation of application Ser. No. 08/292,010, filed Aug. 18, 1994, now U.S. Pat. No. 5,520,358.

TECHNICAL FIELD

The present invention relates to door assemblies, and more specifically to aircraft or other vehicle door assemblies including a shear layer control aperture.

BACKGROUND OF THE INVENTION

For a variety of applications, both scientific and otherwise, it has become desirable to include open-air apertures in the fuselages of aircraft or other airborne vehicles. One such application is the installation and operation of optical and sonic equipment for the observation of atmospheric and extra-atmospheric phenomena. Moreover, optical and other scientific equipment positioned to take advantage of an aperture positioned in the fuselage of an aircraft are extremely sensitive, and turbulent airflow in and around the aperture prevents or impairs use of such equipment.

Many scientific applications would benefit from the ability to position highly sensitive scientific equipment within the fuselage of an aircraft or other airborne vehicles and utilizing an open air aperture. When the scientific equipment is in use, the aperture can be fully revealed. When the scientific equipment is not in use, the ability to close the aperture serves as a means to protect and maintain a conditioned environment for the instruments.

For the foregoing and other reasons, there is a need for a door assembly capable of being mechanically positioned either to open or close an aperture in the fuselage of an aircraft or other airborne vehicles with an integral shear layer control.

This invention relates to a door assembly capable of being mechanically positioned either to open or close a shear layer control aperture in the fuselage of an aircraft or other vehicle. The exterior surface of the door assembly is a shear layer control surface for providing an optically and acoustically stable shear layer over the aperture.

SUMMARY OF THE INVENTION

The present invention satisfies the foregoing and other needs by providing a door assembly including a shear layer control aperture mounted over a large aperture in the exterior of an aircraft or other airborne vehicle fuselages. The door assembly includes an upper door, a lower door, an inner door, and an aperture assembly. The upper and lower doors are slidably mounted to external fuselage-mounted tracks concentric with the exterior surface of an aircraft or other vehicle fuselage. The upper door, used to close the upper portion of the aperture during operation, is fixed to the aperture assembly on one end and moves freely along external fuselage-mounted tracks. The lower door, similar in operation to the upper door, is utilized to close the lower portion of the aperture during operation. On a concentric axis immediately below the upper and lower doors there is provided an aperture assembly positioned on tracks mounted internal to the fuselage, the aperture assembly being flush with the exterior surface of the vehicle fuselage. An inner door used to open and close the aperture assembly is mounted on one end to rails on the interior surface of the upper door and on another end to grooves on the exterior side of the aperture assembly. Racks on the interior surface of the inner door engage pinion gears on the exterior surface of the aperture assembly; activation of the pinion gears allowing the inner door to cover or uncover the aperture assembly.

The door assembly of the present invention is powered by a drive motor mounted on the aperture assembly driving parallel shafts through a common transmission. One of the shafts opens and closes the aperture by driving the pinion gears mounted on the exterior surface of the aperture assembly which, in turn, engage racks on the interior surface of the inner door. The other shaft operates pinion gears that drive the aperture assembly upward and downward along the pair of fuselage-mounted racks. The outer doors are utilized to close the opening of the vehicle fuselage vacated as the aperture assembly tracks up and down.

The exterior surface of the aperture assembly provides a shear layer control surface controlling airflow over an opening and controlling the flow along the vehicle fuselage.

The door assembly of the present invention provides effective shear layer control, substantially non-turbulent cavity environment, with minimum drag. Moreover, the design is easy to fabricate, assemble, install and service. Other advantages and applications deriving from the use of the invention will readily suggest themselves to those skilled in the art.

BRIEF DESCRIPTION OF THE DRAWINGS

For a more complete understanding of the present invention and the advantages thereof, reference is now made to the following detailed description taken in conjunction with the accompanying drawings.

DETAILED DESCRIPTION OF THE DRAWINGS

Figure 1:
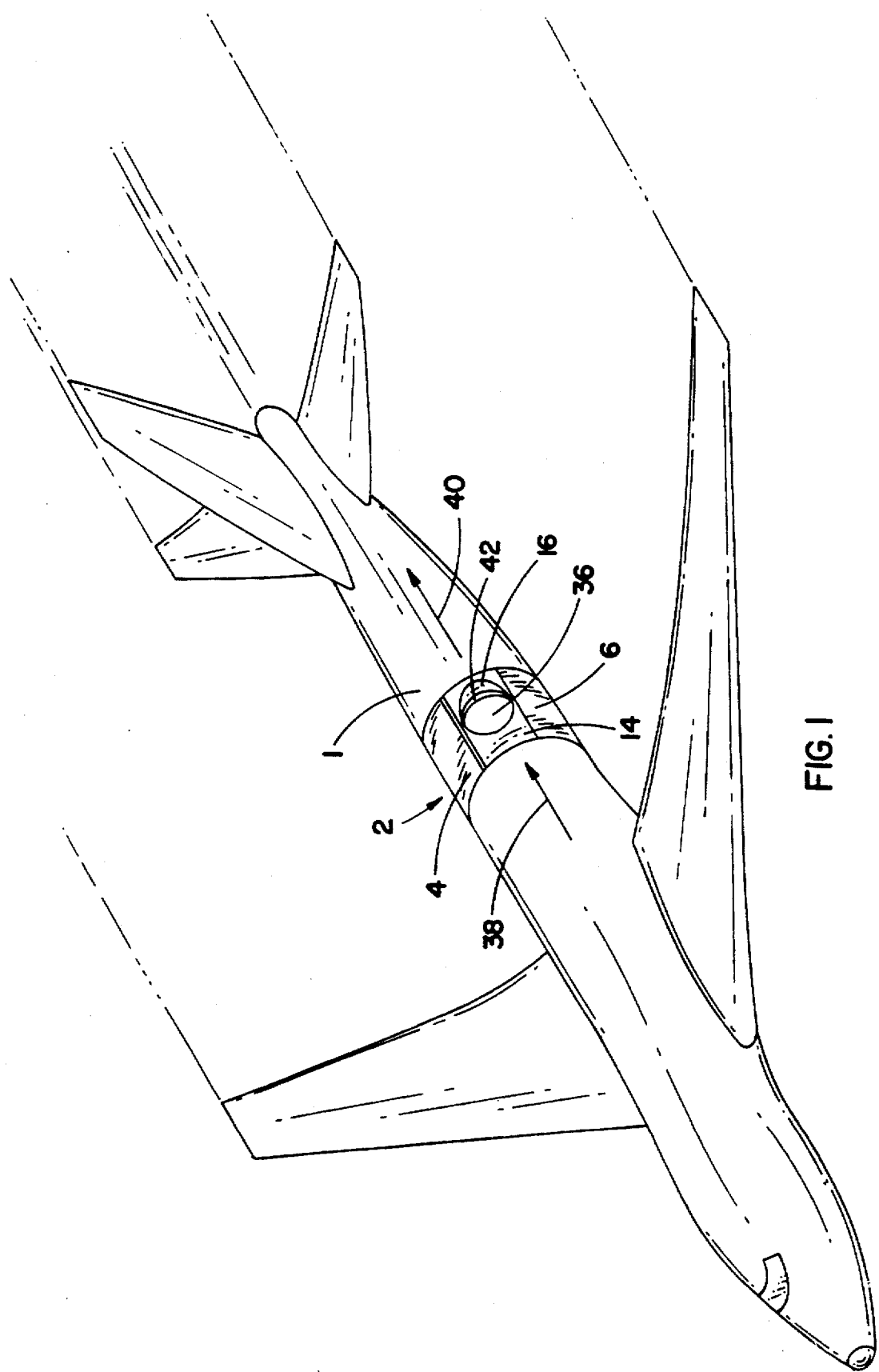
FIG. 1 is a perspective view of the present invention installed on an aircraft having an exposed aperture.

Referring now to FIG. 1, there is illustrated a perspective view of the door assembly 2 with aperture 36 in its "open" position, as installed in an aircraft. In flight, the normal airstream flow across aperture 36 is in the direction indicated by arrows 38 and 40. Without the benefit of the shear layer recovery surface 16 on the downstream edge 42 of the exterior side of aperture 36, substantial turbulence would result in and around aperture 36, thereby adversely affecting the operation of optical and other scientific equipment.

Figure 2:
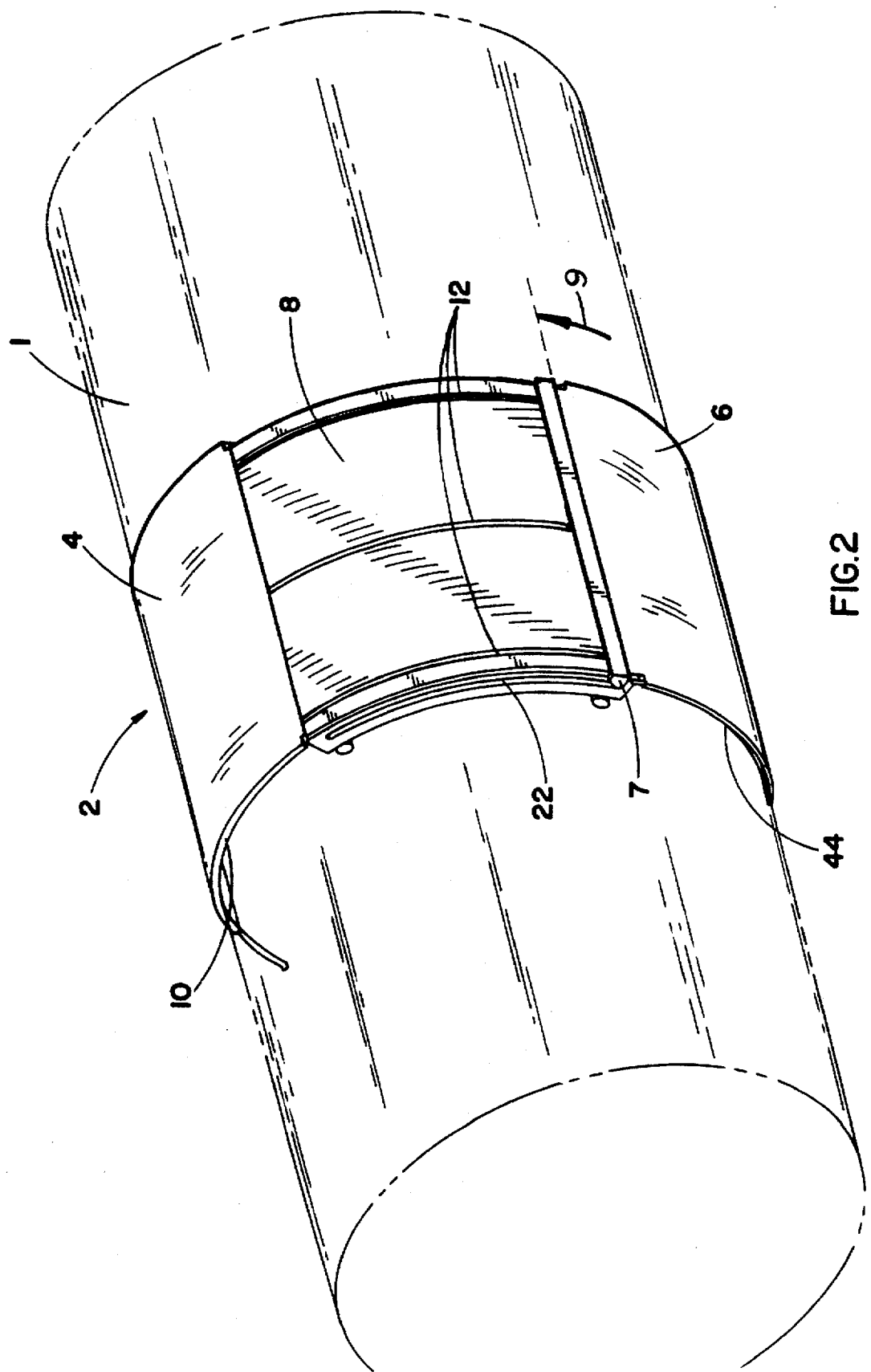
FIG. 2 is a perspective view of the embodiment shown in FIG. 1 with the aperture closed.
Figure 3:
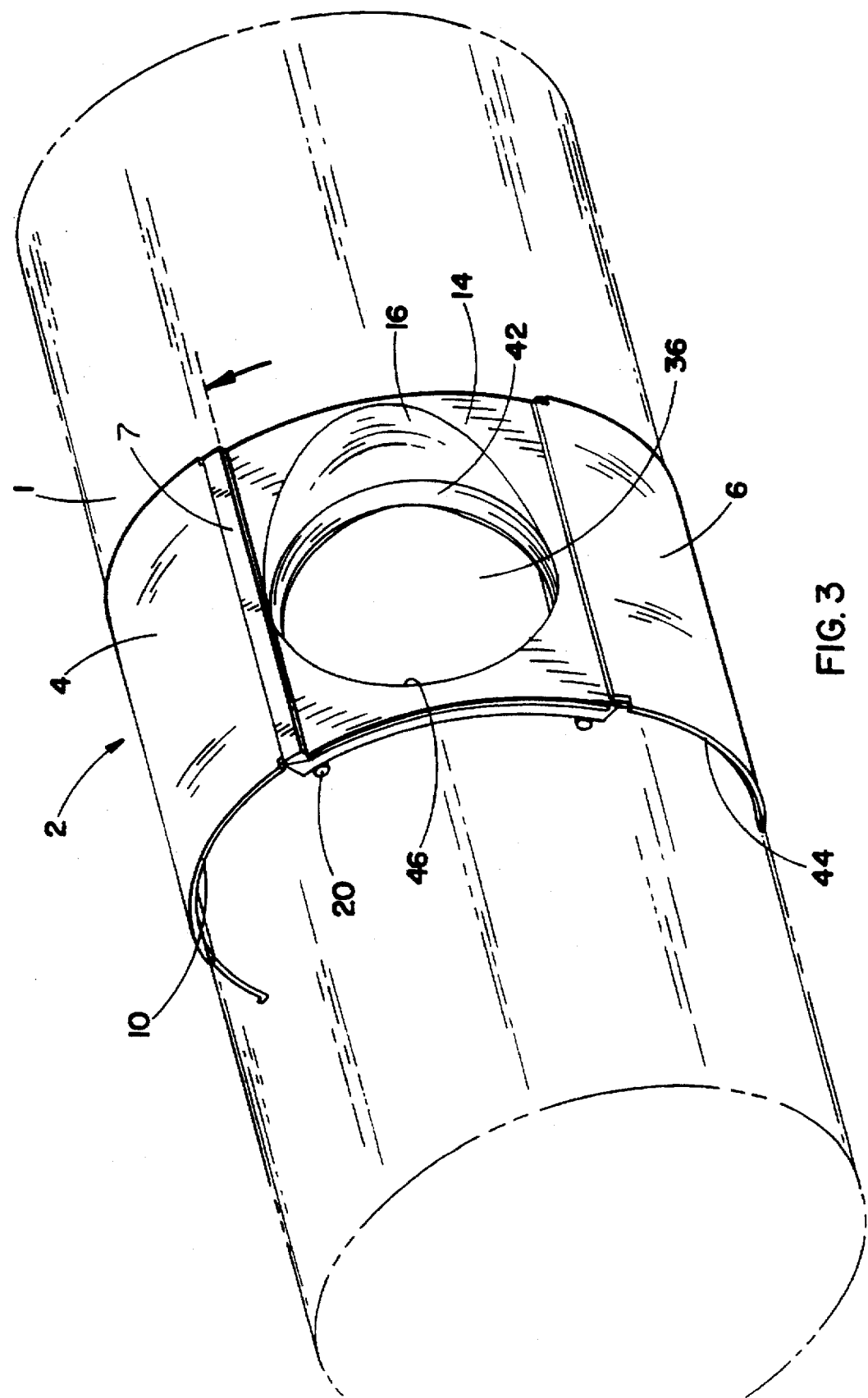
FIG. 3 is a perspective view of the embodiment shown in FIG. 1 with the aperture open.

Referring now to FIGS. 2 and 3, there is shown an exterior view of the door assembly 2 as mounted to the fuselage 1. The door assembly 2 includes an inner door 8, an upper door 4, a lower door 6, and an aperture assembly 14. The inner door 8 is positioned between the upper door 4 and lower door 6, and is slidably mounted to rails 32 (FIG. 9) on the interior surface of upper door 4 on one end, and to an inner door track 22 on the side of aperture assembly 14 on the other end. As illustrated in FIG. 2, the inner door 8 is in its "down" position, concealing the aperture assembly 14 which lies beneath. When moved in the direction of the arrow 9 (FIG. 2), the inner door 8 rolls behind upper door 4 such that when lip 7 abuts the edge of upper door 4, inner door 8 is completely concealed behind upper door 4 and is said to be in its "up" position, as depicted in FIG. 3. With the inner door in its "up" position, the aperture assembly 14 is revealed and is said to be "open."

The entire door assembly 2 is slidably mounted to external tracks 11 and 15 (FIG. 7) to allow the upper door 4, the inner door 8, the lower door 6 and the aperture assembly 14 to move in an upward and downward direction in unison. The lower door 6 slides on tracks 15 to close the opening in fuselage 1 as door assembly 2 moves in an upward and downward direction. The lower door 6 is connected with the aperture assembly 14 on one end, and moves freely in an upward and downward direction on tracks 15 on the other end. Similarly, upper door 4 is connected to aperture assembly 14 on one end while moving freely in an upward and downward direction on tracks 11 on the other end for the same purpose. The ability to move in unison allows the door assembly 2 to have a range of motion for positioning the aperture assembly 14.

Figure 6:
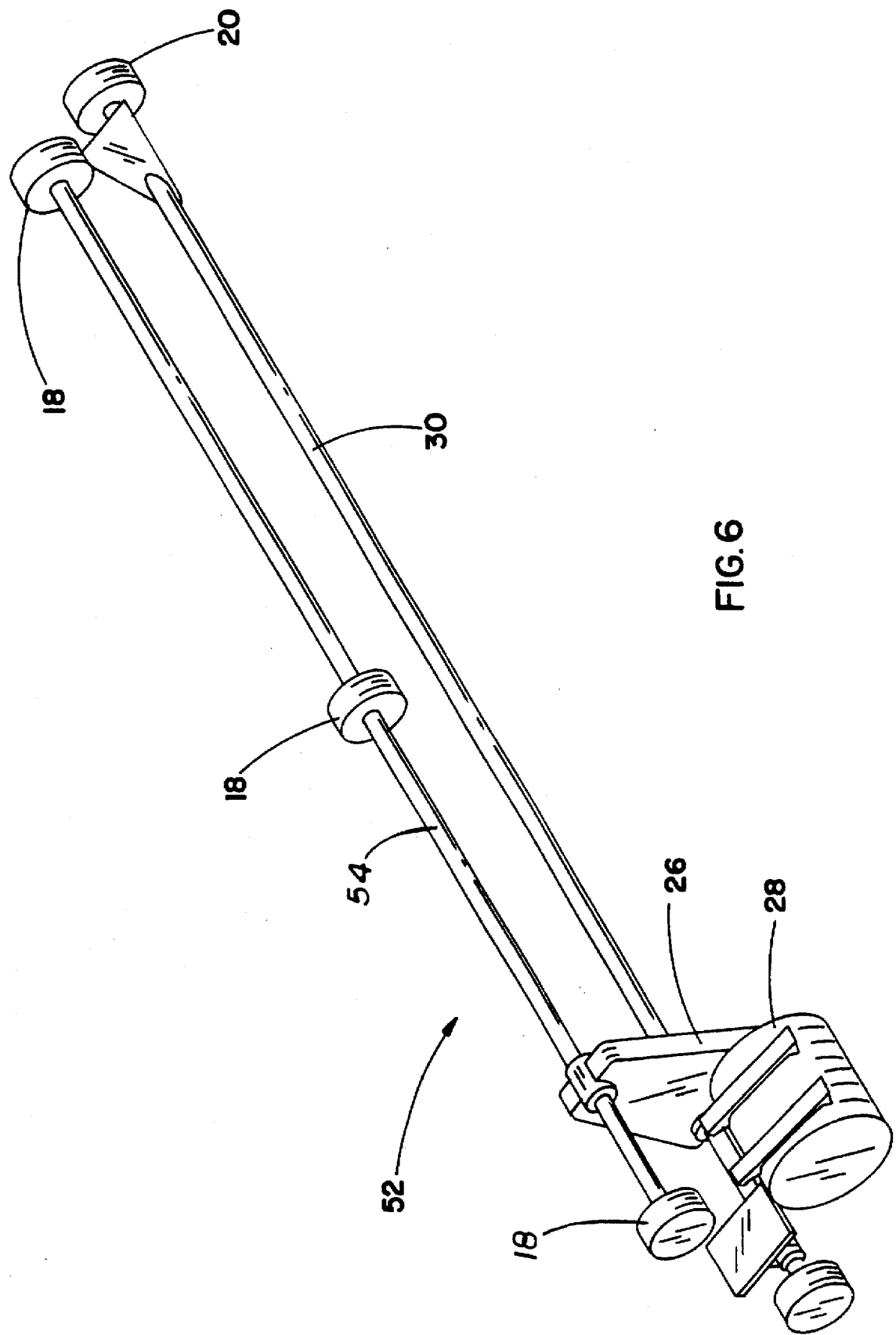
FIG. 6 is an illustration of the drive assembly.
Figure 7:
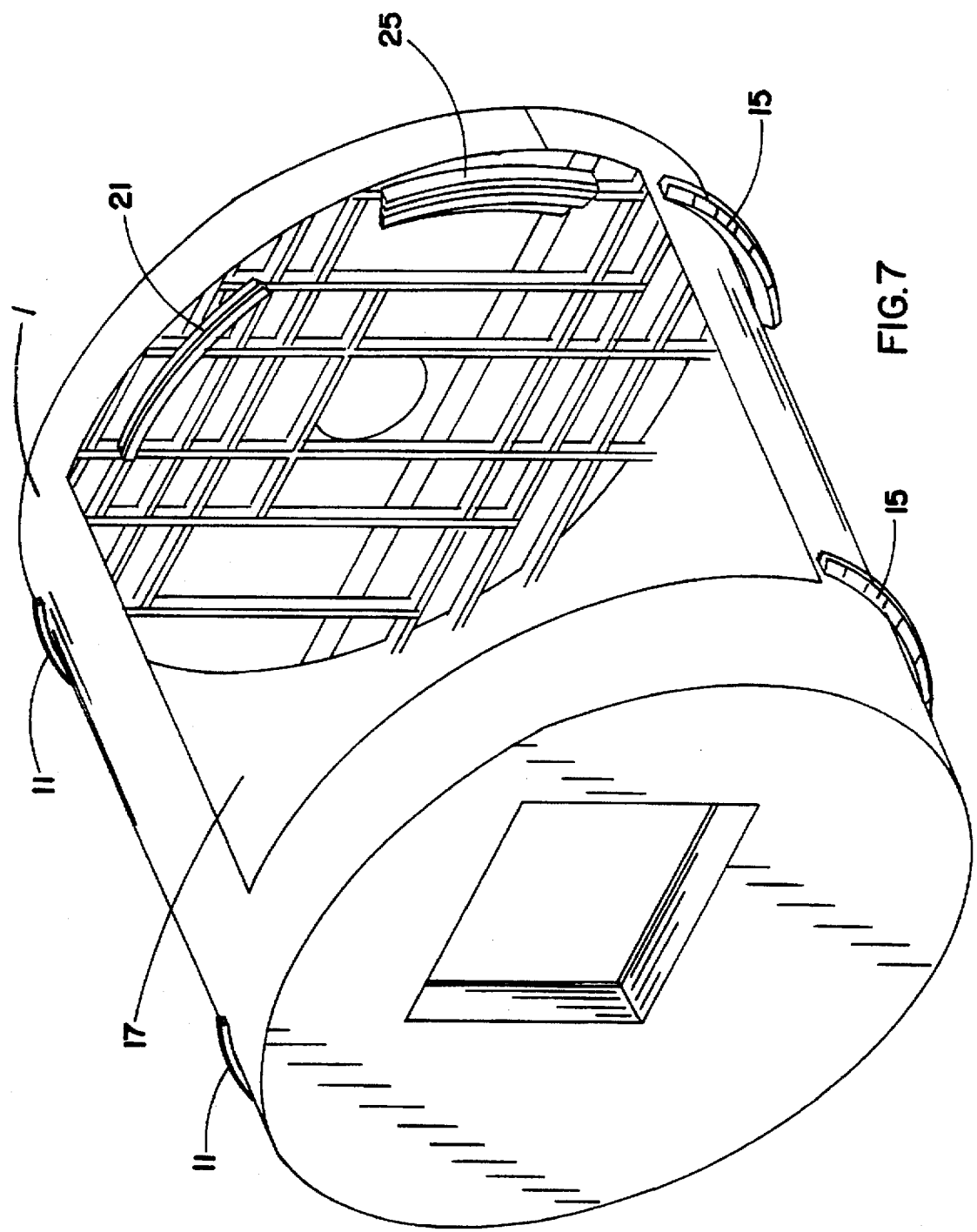
FIG. 7 is a perspective view of the portion of the aircraft fuselage containing the opening used by the aircraft door assembly.

Referring to FIG. 7, there is shown a portion of the fuselage 1 of an aircraft or other vehicle containing aperture 17. Tracks 11 are mounted to the fuselage 1 above aperture 17, while tracks 15 are mounted to the fuselage 1 below aperture 17. Mounted to the fuselage 1 within the interior compartment are rack gears 21 and guides 25. Rack gears 21 engage aperture assembly drive pinion gears 20 (FIG. 5) to provide a means for driving the aperture assembly 14 upward and downward within aperture 17. Guides 25 engage follower wheels 24 (FIG. 5) of the aperture assembly 14 to provide a means for support for the aperture assembly 14 as it travels upward and downward when driven by drive assembly 52 (FIG. 6).

Figure 4:
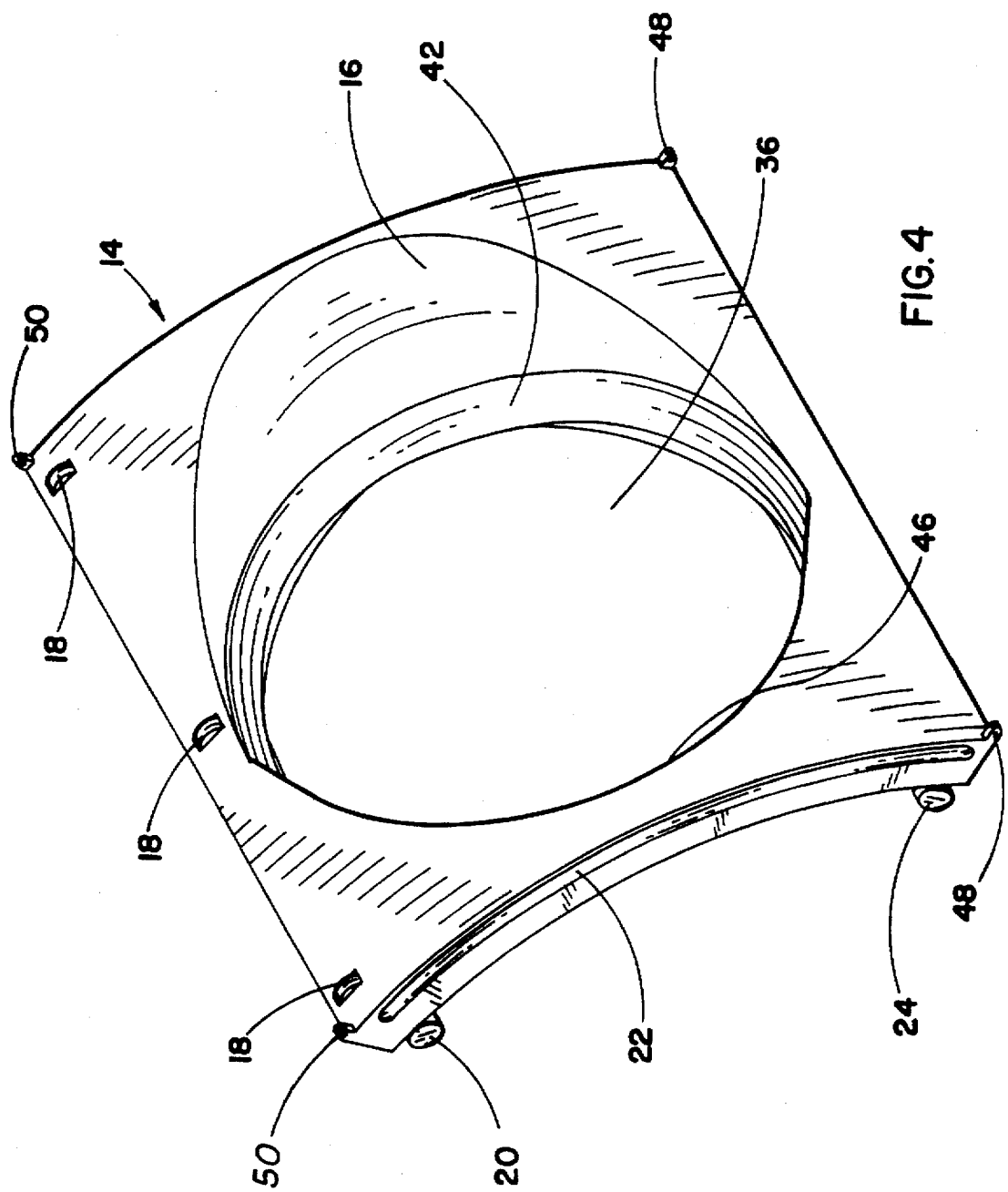
FIG. 4 is a perspective view of the exterior of the inner door of the aperture assembly.

Referring now to FIG. 4, there is illustrated an exterior view of the aperture assembly 14. The aperture assembly 14 defines an aperture 36. Inner door pinions 18 engage racks 34 (FIG. 8) on the interior surface of the inner door 8. Inner door tracks 22 (only one shown in FIG. 4) are located on both the upstream and downstream sides of the aperture assembly 14 and through which lip 7 (FIG. 2) of the inner door 8 travels when the inner door 8 is moved in an upward or downward direction. The upstream edge 46 of aperture 36 is at nearly continuous ninety degree angles from any tangential point selected along the upstream edge 46 of the exterior surface of the aperture assembly 14. Intersecting the upstream edge 46 is shear layer recovery surface 16. Shear layer recovery surface 16 is a curved structure curving down into the vehicle cavity and is convexly shaped in relation to the airstream. The shear layer recovery surface 16 provides a reattachment for the airstream detached at upstream edge 46 of aperture 36 and promotes smooth reattachment of the airstream to the external surface of the vehicle. As the airstream passes in the direction depicted by arrows 38 and 40 (FIG. 1), the airstream detaches from the aperture assembly 14 at the upstream edge 46 of aperture 36 and then travels over the aperture 36 toward the interior of the vehicle cavity. Smooth shear layer flow over aperture 36 is provided by the shear layer recovery surface 16 catching the airstream as it reattaches on the downstream edge 42 of aperture 36 and reattaching the airstream from the aperture 36 to the downstream vehicle surface.

Figure 5:
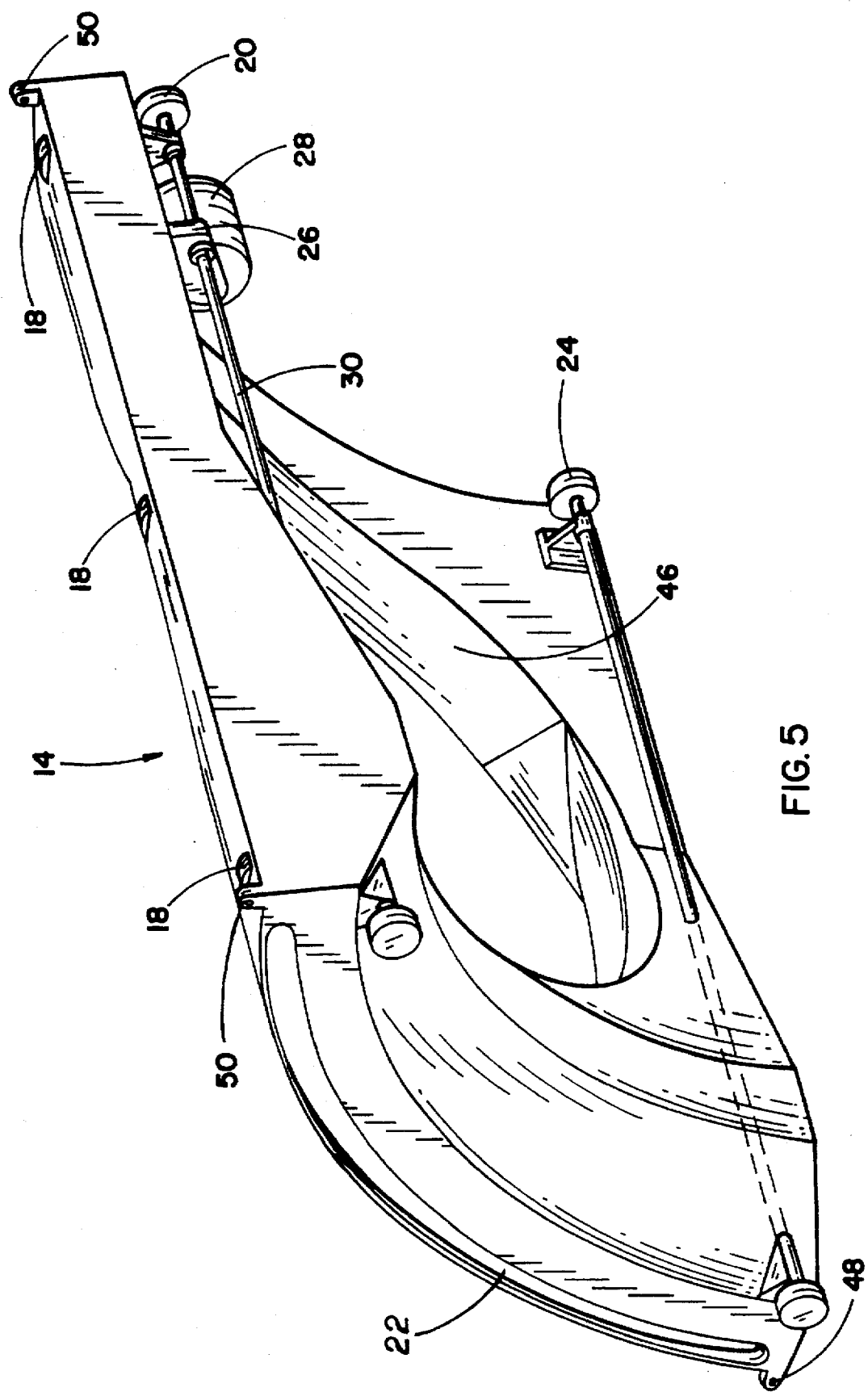
FIG. 5 is a perspective view of the interior of the inner door of the aperture assembly.

Referring now to FIG. 5, there is illustrated an interior view of the aperture assembly 14. Aperture assembly 14 mounts flush with the exterior surface of aircraft fuselage 1 on fuselage-mounted rack gears 21 (FIG. 7). As a drive motor 28 drives shaft 30 so as to rotate aperture assembly drive pinion gears 20, the gears engage the fuselage-mounted rack gears 21 (FIG. 7) to drive the aperture assembly 14 upward or downward. Follower wheels 24 are provided at the bottom of the interior surface of the aperture assembly 14 to engage guides 25 to assist the aperture assembly 14 as it travels along the fuselage-mounted rack gears 21 as the aperture assembly 14 is driven upwardly and downwardly by the drive assembly 52 (FIG. 6).

Referring now to FIG. 6, there is illustrated the drive assembly 52 which operates to both open and close the aperture 36, and to drive the aperture assembly 14 on fuselage-mounted rack gears 21 (FIG. 7). The drive assembly 52 is mounted on the interior surface of the aperture assembly 14 (FIG. 5), and includes the drive motor 28 driving parallel shafts 30 and 54 through a common transmission 26. Shaft 54 drives inner door pinion gears 18 (FIG. 5) mounted on the exterior surface of the aperture assembly 14. The inner door pinion gears 18, in turn, engage racks 34 (FIG. 8) on the interior surface of the inner door 8 for revealing or concealing the aperture 36 with the inner door 8. Shaft 30 drives aperture assembly drive pinion gears 20, while the pinion gears, in turn, engage fuselage-mounted rack gears 21 (FIG. 7) for driving the aperture assembly 14 in an upward or downward direction.

Figure 8:
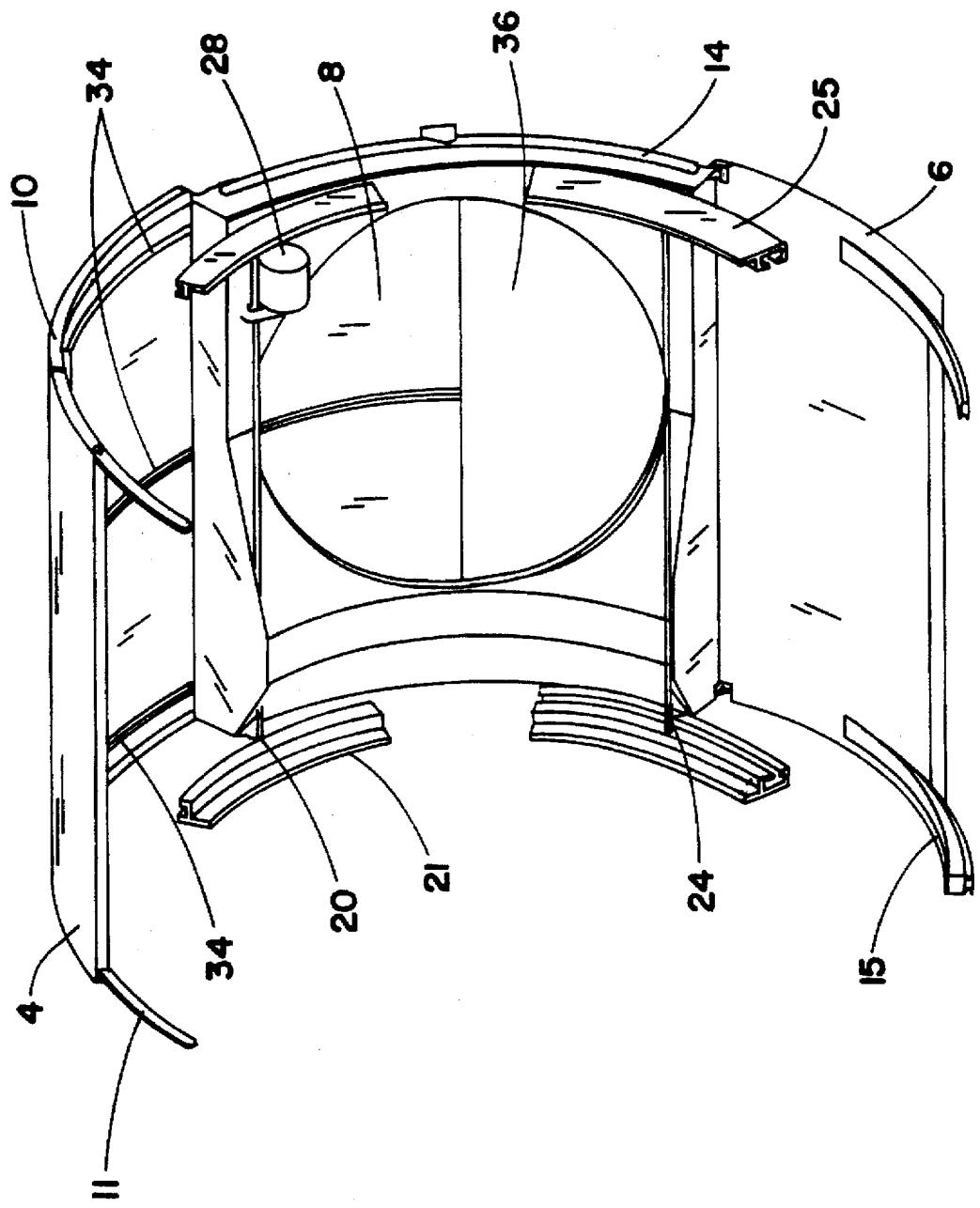
FIG. 8 is a perspective view of the interior of the door assembly.

Referring now to FIG. 8, there is illustrated an interior view of the entire door assembly of the present invention. Mounted to the vehicle fuselage are tracks 11 and 15 shown as integrated with the entire door assembly. Lower door 6 is slidably mounted to tracks 15, while upper door 4 is slidably mounted to track 11. Inner door 8 is depicted partially open, revealing only a portion of aperture 36. On the interior surface of inner door 8 are rack gears 34 which engage pinion gears 18 (FIG. 4) on the exterior surface of aperture assembly 14 for the purpose of moving the inner door upward and downward to open or close the aperture 36. The aperture assembly 14 itself is shown with pinion gears 20 engaging fuselage-mounted rack gears 21 and with follower wheels 24 engaging fuselage-mounted guides 25. Drive assembly 52 (FIG. 6) causes pinion gears 20 to turn against rack gears 21, which in turn causes upward and downward movement of aperture assembler 14. With follower wheels 24 engaged by guides 25, smooth and stable support is provided the lower portion of aperture assembly 14 as it travels in an upward and downward direction. Moreover, the positioning of the fuselage-mounted rack gears 21 and guides 25 ensure that the exterior surface of aperture assembly 14 is flush with the exterior surface of the vehicle fuselage. It is important that the exterior surfaces of the aperture assembly 14 and the vehicle fuselage be flush in order for the shear layer control surface of aperture assembly 14 to be effective.

Figure 9:
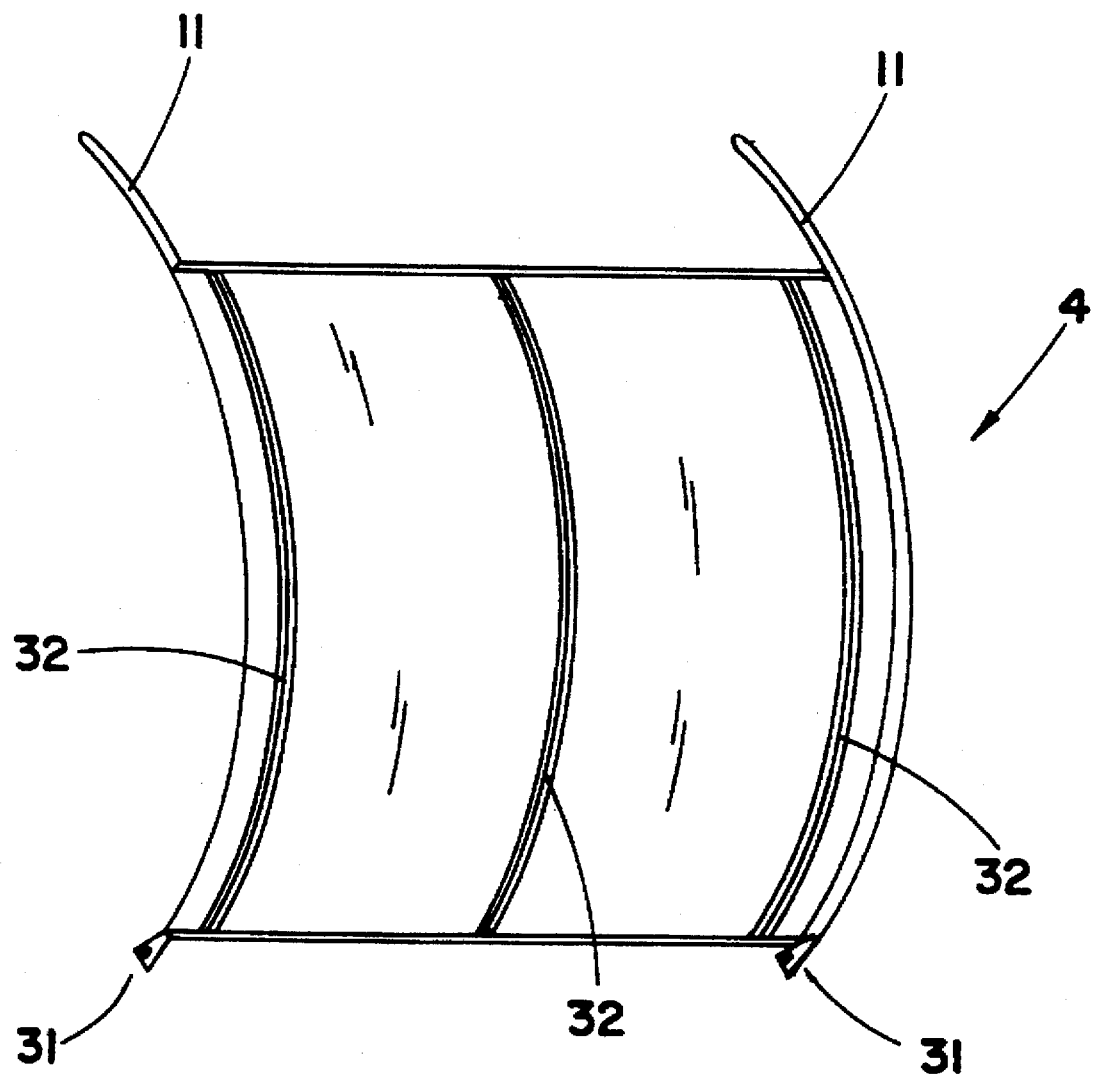
FIG. 9 is an interior view of the upper door.

Referring now to FIG. 9, there is illustrated an interior view of the upper door 4. Spaced across the interior surface are internal rails 32 engaging the inner door rails 12 (FIG. 2) and guiding the inner door 8 as it travels beneath the upper door 4.

Although the preferred embodiment of the invention has been illustrated in the accompanying drawings and described in the foregoing Detailed Description, it will be understood that the invention is not limited to the embodiment disclosed, but is capable of numerous rearrangements and modifications of steps without departing from the spirit of the invention.

We claim:

1. An apparatus for selectively opening and closing an open-air aperture in the fuselage of an aircraft, comprising:

a first exterior door mounted to the aircraft for closing the aperture;

a second exterior door mounted to the aircraft for closing the aperture in conjunction with the first door;

an inner door mounted for movement beneath the first and second doors;

an aperture assembly mounted to the aircraft to move beneath the inner door, the aperture assembly positioned substantially flush with the exterior surface of the aircraft, the aperture assembly including an aperture, an interior surface and an exterior surface; and a drive motor for positioning the aperture assembly with reference to the inner door.

2. The apparatus of claim 1, further comprising tracks mounted on the aircraft, wherein the first door has a first end and a second end, the first end being coupled to the aperture apparatus, and the second end being movably mounted on the tracks.

3. The apparatus of claim 1, wherein the first door has an internal surface and an external surface, the internal surface including rails for guiding the inner door adjacent to the first door.

4. The apparatus of claim 1, including tracks mounted to the aircraft, and wherein the second door has a first end and a second end, the first end coupled to the aperture assembly, and the second end being movably mounted to the tracks.

5. The apparatus of claim 1, wherein the inner door includes inner door rails, the inner door being movably mounted on the rails of the first door.

6. The apparatus of claim 1, wherein the exterior surface of the aperture assembly defines a shear layer control surface.

7. An apparatus for selectively opening and closing an open-air aperture in the fuselage of an aircraft, comprising:

a first exterior door mounted to the aircraft for closing the aperture;

a second exterior door mounted to the aircraft for closing the aperture in conjunction with the first door;

a moveable inner door having an exterior side and an interior side, the inner door mounted beneath the first and second doors, and above the exterior surface of the aircraft, the inner door further positioned so as to be concealed behind the first door when positioned beneath the first door;

an aperture assembly mounted to the aircraft to move beneath the inner door, the aperture assembly positioned substantially flush with the exterior surface of the aircraft, the aperture assembly including an aperture, an interior surface and an exterior surface; and a rack and pinion drive for positioning the aperture assembly with reference to the inner door.

8. The apparatus of claim 7, further comprising tracks mounted on the aircraft, wherein the first door has a first end and a second end, the first end being coupled to the aperture apparatus, and the second end being movably mounted on the tracks.

9. The apparatus of claim 7, wherein the first door has an internal surface and an external surface, the internal surface including rails for guiding the inner door adjacent to the first door.

10. The apparatus of claim 7, including tracks mounted to the aircraft, and wherein the second door has a first end and a second end, the first end coupled to the aperture assembly, and the second end being movably mounted to the tracks.

11. The apparatus of claim 7, wherein the inner door includes inner door rails, the inner door being movably mounted on the rails of the first door.

12. The apparatus of claim 7, wherein the exterior surface of the aperture assembly defines a shear layer control surface.

13. An apparatus for selectively opening and closing an open-air aperture in the fuselage of an aircraft, comprising:

a first exterior door mounted to the aircraft for closing the aperture;

a second exterior door mounted to the aircraft for closing the aperture in conjunction with the first door;

an aperture assembly mounted to the aircraft, the aperture assembly positioned substantially flush with the exterior surface of the aircraft and including an aperture, an interior surface and an exterior surface, the exterior surface of the aperture assembly further comprising a shear layer control surface; and tracks mounted on the aircraft, wherein the first door has a first end and a second end, the first end being coupled to the aperture apparatus, and the second end being movably mounted on the tracks.

14. The apparatus of claim 13, further comprising a rack and pinion drive for positioning the aperture assembly with reference to the inner door.

15. The apparatus of claim 13, further comprising a drive motor for positioning the aperture assembly with reference to the inner door.

16. The apparatus of claim 13, wherein the first door has an internal surface and an external surface, the internal surface including rails for guiding the inner door adjacent to the first door.

17. The apparatus of claim 13, wherein the inner door includes inner door rails, the inner door movably mounted on the rails of the first door.

18. The apparatus of claim 13, further comprising a moveable inner door having an exterior side and an interior side, the inner door mounted beneath the first and second doors, and above the exterior surface of the aircraft, the inner door further positioned so as to be concealed behind the first door when positioned beneath the first door.

* * * * *